(12) United States Patent

Stone

(10) Patent No.: US 6,789,349 B1
(45) Date of Patent: Sep. 14, 2004

(54) DISPENSING FISH LURE

(76) Inventor: Charles Stone, 5796 SW. 89 Way, Cooper City, FL (US) 33328

(*) Notice: Subject to any disclaimer, the term of this patent is extended or adjusted under 35 U.S.C. 154(b) by 0 days.

(21) Appl. No.: 10/457,431

(22) Filed: Jun. 10, 2003

(51) Int. Cl.$^7$ .............................................. A01K 85/01
(52) U.S. Cl. ........................................................ 43/42.06
(58) Field of Search ............................ 43/42.06, 44.99

(56) References Cited

U.S. PATENT DOCUMENTS

| | | | | | |
|---|---|---|---|---|---|
| 1,249,194 | A | * | 12/1917 | Race | 43/42.06 |
| 1,393,617 | A | * | 10/1921 | Frame | 43/42.06 |
| 2,091,457 | A | * | 8/1937 | Sauer | 43/42.06 |
| 2,383,246 | A | * | 8/1945 | Fiskaali | 43/42.06 |
| 2,666,275 | A | * | 1/1954 | Smith | 43/42.06 |
| 2,674,058 | A | * | 4/1954 | Lindenberg | 43/42.06 |
| 2,703,945 | A | * | 3/1955 | Johnson | 43/42.06 |
| 2,745,206 | A | * | 5/1956 | Gaw | 43/42.06 |
| 2,836,001 | A | * | 5/1958 | Silen | 43/42.06 |
| 2,968,886 | A | * | 1/1961 | Cotroumpas | 43/42.06 |
| 3,505,755 | A | * | 4/1970 | Pearce | 43/42.06 |
| 3,835,572 | A | * | 9/1974 | Mounsey | 43/42.06 |
| 3,987,575 | A | * | 10/1976 | Morita | 43/42.06 |
| 4,257,182 | A | * | 3/1981 | Thom | 43/42.06 |
| 4,267,658 | A | * | 5/1981 | Brown et al. | 43/42.06 |
| 4,744,167 | A | | 5/1988 | Steele | |
| 4,799,328 | A | | 1/1989 | Goldman | |
| 4,823,497 | A | * | 4/1989 | Pierce | 43/42.06 |
| 4,888,907 | A | | 12/1989 | Gibbs | |
| 4,962,609 | A | * | 10/1990 | Walker | 43/42.06 |
| 4,998,370 | A | * | 3/1991 | Lawler et al. | 43/42.06 |
| 5,018,297 | A | * | 5/1991 | Kennedy, Jr. | 43/42.06 |
| 5,113,606 | A | | 5/1992 | Rinker | |
| 5,142,811 | A | * | 9/1992 | Freeman | 43/42.06 |
| 5,155,947 | A | * | 10/1992 | Rivard | 43/42.06 |
| 5,170,579 | A | * | 12/1992 | Hollinger | 43/42.06 |
| 5,172,510 | A | * | 12/1992 | Lovell, Jr. | 43/42.06 |
| 5,299,378 | A | * | 4/1994 | Ballard | 43/42.06 |
| 5,471,780 | A | * | 12/1995 | Hopson | 43/42.06 |
| 6,041,538 | A | * | 3/2000 | Roemer | 43/42.06 |
| 6,061,947 | A | * | 5/2000 | Mooers | 43/42.06 |
| 6,079,145 | A | * | 6/2000 | Barringer | 43/42.06 |
| 6,161,324 | A | | 12/2000 | Hugunin | |
| 6,192,617 | B1 | * | 2/2001 | Lyles | 43/42.06 |
| 6,354,037 | B2 | | 3/2002 | Coppola, Jr. | |
| 6,393,756 | B1 | * | 5/2002 | Forney et al. | 43/42.06 |
| 6,412,214 | B1 | * | 7/2002 | Sebastiani | 43/42.06 |
| 6,668,482 | B1 | * | 12/2003 | Ruffin et al. | 43/42.06 |
| 2003/0009927 | A1 | * | 1/2003 | Rice | 43/42.06 |
| 2003/0126785 | A1 | * | 7/2003 | Poinski | 43/42.06 |

FOREIGN PATENT DOCUMENTS

| | | | | | |
|---|---|---|---|---|---|
| CA | 2220302 | A1 | * | 5/1999 | |
| FR | 2342026 | B1 | * | 10/1977 | |
| FR | 2667482 | B1 | * | 4/1992 | |
| FR | 2782895 | B1 | * | 3/2000 | |
| GB | 794152 | B1 | * | 4/1958 | 43/42.06 |
| GB | 2181931 | A1 | * | 5/1987 | 43/42.06 |
| JP | 2001-69877 | B1 | * | 3/2001 | |
| JP | 2002-131 | B1 | * | 1/2002 | |
| JP | 2003-144013 | B1 | * | 5/2003 | |
| WO | WO-01/95712 | A1 | * | 12/2001 | |

* cited by examiner

*Primary Examiner*—Darren W. Ark
(74) *Attorney, Agent, or Firm*—Alvin S. Blum

(57) ABSTRACT

A fishing lure has an attachment for a fishing line to pull the lure through a body of water to attract and catch fish. One or more hooks are attached to the body of the lure. A refillable chamber enclosed within the lure body is arranged to hold a liquid fish attractant. An elongate wick made of a material that absorbs the liquid attractant is immersed in the liquid in the chamber. One end of the wick extends from the chamber through a passage in the body of the lure to be in communication with the body of water. The liquid attractant is thereby eluted from the end of the wick in very small amounts as the lure is pulled through the water to attract fish to the lure.

2 Claims, 2 Drawing Sheets

DISPENSING FISH LURE

This invention relates to fishing lures and more particularly to fishing lures that hold liquid attractant with means for dispensing the attractant into the water to attract fish.

BACKGROUND OF THE INVENTION

U.S. patent application publication US 2003/0009927 by Rice discloses a fishing lure with a chamber for containing a liquid fish attractant and an orifice for controllably emitting the attractant including a valve mechanism. It discusses U.S. Pat. No. 4,799,328 to Goldman and U.S. Pat. No. 4,888,907 to Gibbs. Other US patents related to attractant in lures include U.S. Pat. No. 6,354,037 to Coppola; U.S. Pat. No. 6,161,324 and US 2002/0029509 to Huganin; U.S. Pat. No. 5,113,606 to Rinker; U.S. Pat. No. 5,471,780 to Hopson; U.S. Pat. No. 3,987,575 to Morita; and U.S. Pat. No. 2,703,945 to Johnson. None of the prior art disclose a wick mechanism for dispensing the attractant from a chamber within the lure body.

SUMMARY OF THE INVENTION

It is accordingly an object of the invention to provide a fishing lure that encloses a refillable chamber to contain liquid fish attractant. It is another object to provide the lure with a means of dispensing that attractant by employing a wick that has the property of absorbing the attractant. It is yet another object that the wick extend from within the chamber to a communication with the body of water in which the lure is immerse By this mechanism the attractant is slowly dispensed from the chamber into the water where it will attract fish. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
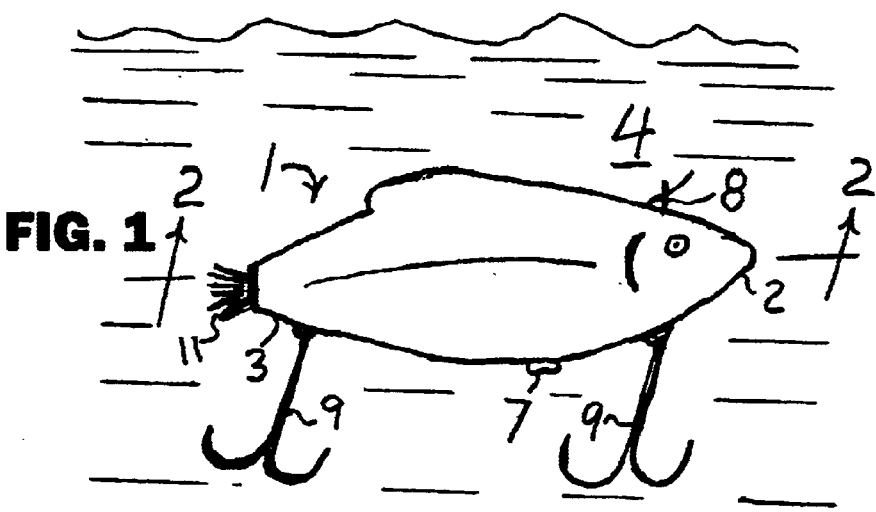
FIG. 1 is a side elevation view of a lure of the invention.
Figure 2:
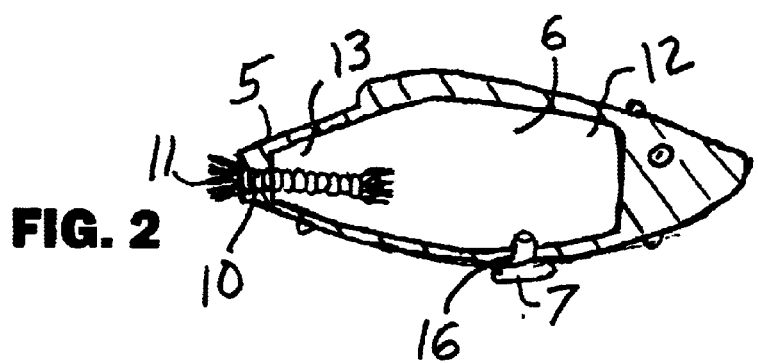
FIG. 2 is a sectional view taken on line 2—2 of FIG. 1

Referring now to the drawing FIGS. 1 and 2, a fishing lure body 1 has a forward end 2 with a line attachment 8 for attaching to the end of a fishing line for pulling through a body of water 4. It is expected that fish in the body of water will be attracted to the lure by its appearance and/or motion suggesting an edible portion One or more single, double, or treble hooks 9 are attached to the lure to catch the fish Lures of the invention are equipped with a means of dispensing small amounts of a liquid fish attractant into the body of water to further entice the fish to bite the lure. A refillable chamber 6 is contained within the lure body 1. A fill hole 16 communicates with the forward end 12 of the chamber for adding liquid attractant to the chamber. A closure 7 removably seals the hole 16. A passage 10 connects the rear end 13 of the chamber to the outer surface 5 of the lure. An absorbent wick II having the property of absorbing the liquid fish attractant is disposed within the chamber and extends through the passage 10 to be in contact with the body of water so that small amounts of the attractant are dispensed into the water. As attractant is washed away from the wick into the water, more liquid from the chamber moves by capillarity to replace it, so that small amounts are continuously dispensed into the water.

Figure 3:
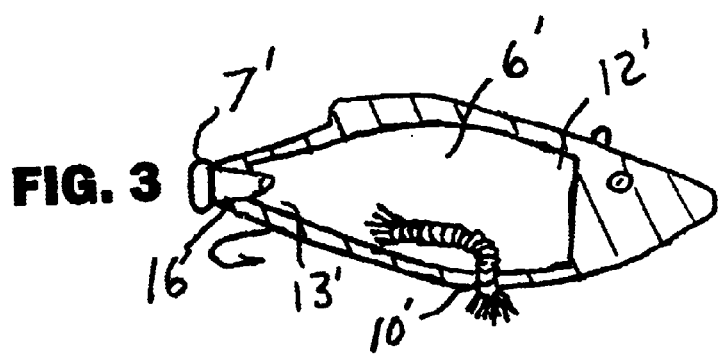
FIG. 3 is a sectional view of another embodiment of the invention.

Referring now to FIG. 3, another embodiment of the invention is shown in which the closure 7' and fill hole 16' are at the rear end 13' of the chamber and the passage 10' with the wick 11' extending therefrom are at the forward end 12' of the chamber 6'. This positioning may have the advantage of preventing excessive loss of liquid from the centrifugal forces generated during casting of the lure.

Figure 4:
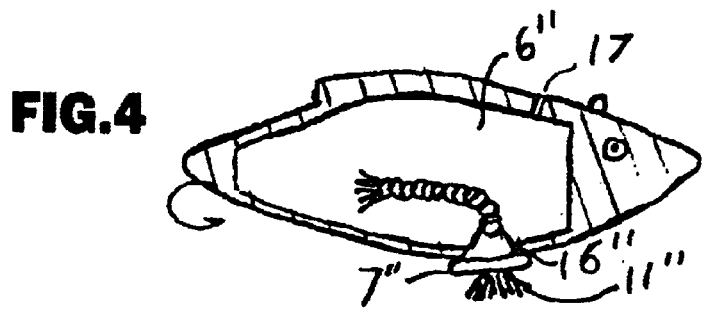
FIG. 4 is a sectional view of another embodiment of the invention
Figure 5:
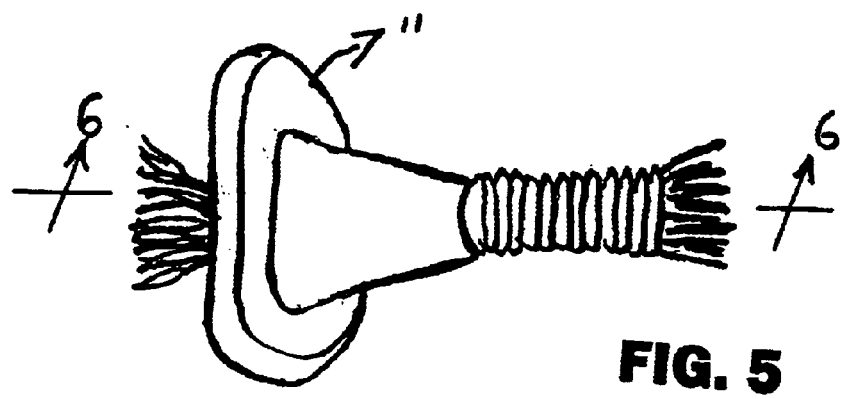
FIG. 5 is a perspective view of a detail of the fill plug of FIG. 4.
Figure 6:
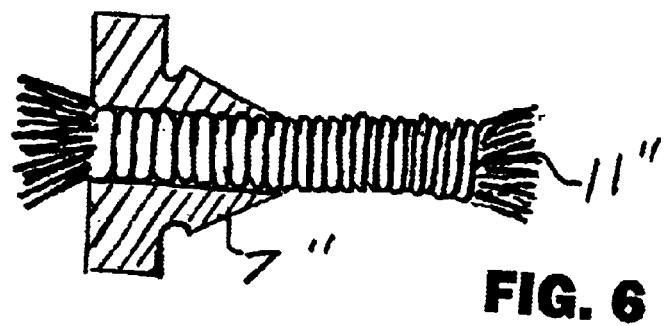
FIG. 6 is a sectional view taken through line 6—6 of FIG. 5.

Referring now to FIGS. 4–6, another embodiment of the invention is shown in which the closure 7" and fill hole 16" are at the forward end 12" of the chamber 6". The fill hole also serves as the passage for the wick 11" that is within the closure 7". The chamber is refilled by pulling out the closure, with its wick, to provide access to the chamber 6".

Figure 7:
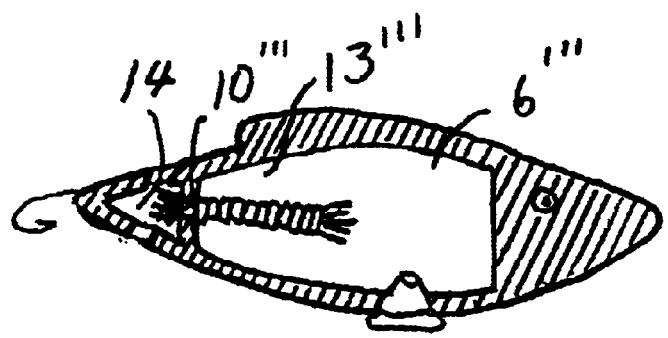
FIG. 7 is a sectional view of another embodiment of the invention.

Referring now to FIG. 7, another embodiment of the invention is shown in which the passage 10''' is at the rear end 13''' of the chamber 6'''. The wick end extends through the passage 10''' into a secondary chamber 14 that is in communication with the body of water 4. This shields the wick end from direct exposure on the lure surface where it may interfere with the hydrodynamic action of the lure, or be chewed by the fish. Optionally, a very fine vent hole 17 may be provided to equalize pressure as attractant is eluted from the chamber.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A fishing lure for attachment to a fishing line for movement through a body of water, the lure comprising:

A) a body having a forward end, a rear end, and an outer surface;

B) a refillable chamber within the body for receiving liquid fish attractant;

C) at least one hook attached to the body;

D) means at the forward end for attaching the lure to the fishing line;

E) a passage connecting the chamber to the outer surface;

F) a closure for removably closing the passage after filling the chamber with attractant, the closure having a channel extending from the outer surface through to the chamber when inserted in the passage; and G) an elongate wick capable of absorbing the liquid attractant, the wick having a first end within the chamber, an intermediate portion passing through the channel, and a second end extending past both the outer surface of the body and the closure and capable of communicating with the body of water when the closure is inserted in the passage.

2. A fishing lure for attachment to a fishing line for movement through a body of water, the lure comprising:

A) a body having a forward end, a rear end, and an outer surface;
B) a refillable chamber within the body for receiving liquid fish attractant;
C) at least one hook attached to the body;
D) means at the forward end for attaching the lure to the fishing line;
E) a passage connecting the chamber to the outer surface at the forward end of the lure;
F) a closure for removably closing the passage after filling the chamber with attractant, the closure having a channel extending from the outer surface through to the chamber when inserted in the passage; and
G) an elongate wick capable of absorbing the liquid attractant, the wick having a first end within the chamber, an intermediate portion passing through the channel, and a second end extending past both the outer surface of the body and the closure and capable of communication with the body of water when the closure is inserted in the passage.

* * * * *